March 11, 1930.　　G. SHEAFFER　　1,750,056
BRAKE LINING TIGHTENER
Filed June 12, 1928
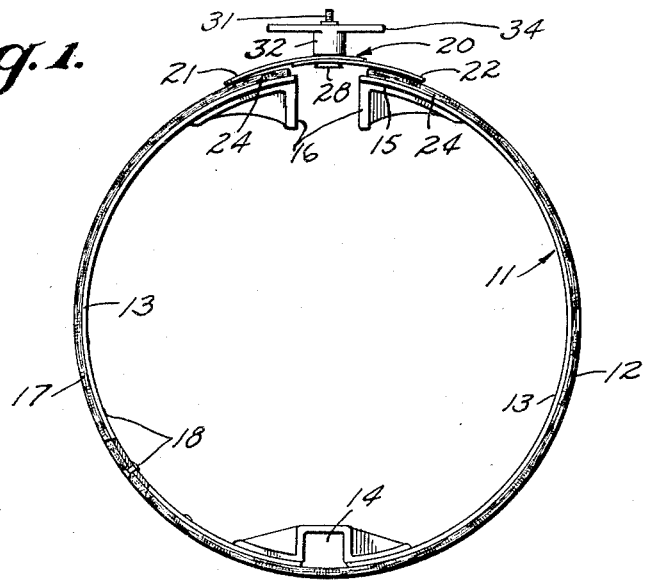
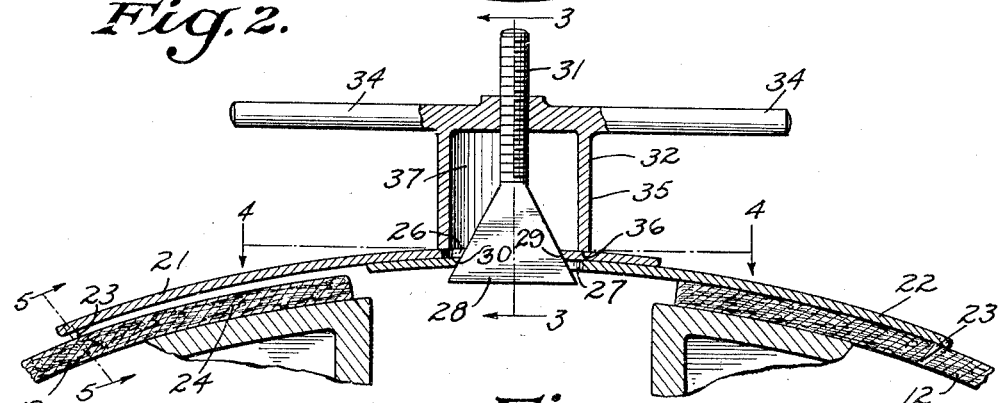
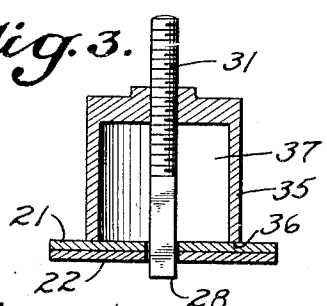
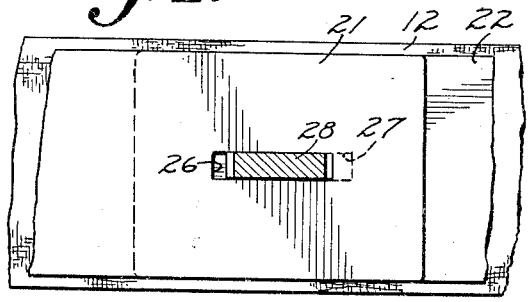
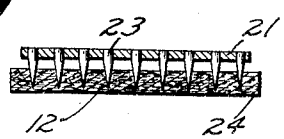
INVENTOR:
George Sheaffer,
BY
ATTORNEY.

Patented Mar. 11, 1930

1,750,056

UNITED STATES PATENT OFFICE

GEORGE SHEAFFER, OF HOLLYWOOD, CALIFORNIA

BRAKE-LINING TIGHTENER

Application filed June 12, 1928. Serial No. 284,849.

My invention relates to brake-relining equipment, and it has to do particularly with a brake-lining tightening clamp which is useful for holding brake-lining onto the brake shoe or internal brake while the brake-lining is being perforated or riveted in place.

My invention is particularly useful in the installing of brake-lining on internal shoes or internal bands of an internal brake, and in order that the features and advantages of my invention may be fully appreciated, I shall briefly refer to the brake-lining industry. The ordinary internal brake includes an outer drum, inside of which an expanding assembly is located. The expanding assembly consists of an internal band or shoe, the exterior faces of which are provided with brake-lining. The internal band or shoes are expanded by a suitable means, and when so expanded the brake-lining engages the outer drum, and the energy of the moving part is absorbed.

In order to have an efficient brake, the brake-lining should be smoothly attached to the internal band or shoe to avoid buckling. For this reason care must be exercised when riveting the brake-lining to the internal band or shoe.

My invention provides a brake lining tightener by which the brake lining may be held firmly in contact with the internal band or shoe, and while the securing operations are being performed, in order to prevent a buckling of the brake-lining on the parts to which it is riveted.

One feature of the clamping construction of my invention is that the clamp plates are operated by means of a wedge member to place a tension on the lining or other parts which are being clamped.

Another feature of the invention is that the clamp plates are retained in place between the wedge and the wedge-working means.

Another feature of the invention is the simplicity of construction. My invention in its preferred form utilizes only four parts.

In the detailed description which is to follow, various other features and advantages of my invention will be explained.

Referring to the accompanying drawings in which the invention and its utility is illustrated, Fig. 1 is a view showing the manner in which the clamp of my invention is utilized for holding the brake-lining onto the internal band or shoe.

Fig. 2 is an enlarged view partly in section showing the details of my invention.

Fig. 3 is a section taken on the line 3—3 of Fig. 2.

Fig. 4 is a fragmentary section taken on the line 4—4 of Fig. 2.

Fig. 5 is a fragmentary section taken on the line 5—5 of Fig. 2.

Referring to Fig. 1 of the drawings, the numeral 11 represents the internal part of the brake, onto which the brake-lining 12 is secured. The internal portion 11 in the form shown consists of two cylindrical band-portions 13, which are separated from each other by a recess 14 adapted to receive a supporting means when the part 11 is assembled in a brake. Ends 15 of the cylindrical band-portions 13 are provided with adjacent abutments 16, against which an operating means for the brake may work in order to expand the part 11 and effect a braking action. The brake-lining 12 is secured to external faces 17 of the cylindrical band-portions 13 by rivets 18. As pointed out heretofore, it is essential that the brake-lining 12 be devoid of any buckles.

The numeral 20 represents the brake-lining tightener of my invention, which has a particular utility in the brake-lining industry. As best shown in Figs. 2 to 5 inclusive, the brake-lining tightener 20 consists of a pair of clamp-plates 21 and 22 which are arcuated as shown. The outer ends of the clamp-plates 21 and 22 are provided with teeth 23, as illustrated best in Fig. 5, which teeth 23 are adapted to engage the ends 24 of the brake-lining 12. The adjacent ends of the clamp-plates 21 and 22 overlap, as shown best in Fig. 2, and the adjacent faces preferably contact each other. These overlapping ends of the clamp-plates 21 and 22 are provided with slots 26 and 27 respectively. The slots 26 and 27 are likewise in overlapping relation.

Adapted to extend through the overlapping slots 26 and 27 is an operating wedge 28. The operating wedge 28 is adapted to engage a face 29 which forms one end of the slot 26, and also to engage a face 30 which forms one end of the slot 27. The faces 29 and 30 are oppositely arranged.

Extending from the narrow end of the operating wedge 28 is a threaded stem 31. Screwed onto the threaded stem 31 is a nut 32 having levers 34 extending outward therefrom whereby the nut 32 is rotated to be advanced upward or downward on the threaded stem 31. The nut 32 is provided with a cylindrical rim 35, the lower edge 36 of which is adapted to engage the upper face of the clamp-plate 21. The cylindrical rim 35 surrounds a cavity 37, into which the upper part of the operating wedge 28 may extend.

The operation of my invention is as follows: The lining to be secured to the part 11 is first cut to an approximate size and then laid in contact with the outer face 17 of the cylindrical band-portions 13. The brake-lining tightener or clamp of my invention is then applied to the ends of the lining 12, as shown in Figs. 1 and 2. At this time the operating wedge may be in a lower position relative to the clamp-plates 21 and 22 than is shown in Fig. 2. This will permit the clamp-plates to be extended more than is illustrated in Fig. 2. When the teeth 23 have been embedded in the ends of the lining 12, the nut 32 is rotated so that the lower edge 36 of the cylindrical rim 35 thereof engages the top face of the clamp-plate 21.

The operating wedge 28 is pulled upward and is brought into engagement with the end faces 29 and 30. As the operating wedge 28 is pulled upward the wedge-faces thereof force the end-faces 29 and 30 away from each other and consequently the clamp-plates 21 and 22 are retracted or are pulled together so that they overlap each other a greater amount. This pulls the ends of the brake-lining 12 toward each other, and the brake-lining is tightly clamped or may be tightly stretched on the inner part 11. The clamp 20 is left in place until all of the rivets 18 have been attached, at which time the brake-lining 12 is completely attached to the inner part 11. The use of the invention for applying brake-lining absolutely precludes any buckling of the brake-lining, and furthermore adds to the convenience of riveting the brake-lining to the inner portion 11.

The wedge for operating the clamps 21 and 22 is a simple and effective device. Not only is it positive in operation, but it is quite easy to manipulate.

By placing the clamp-plates 21 and 22 between the wider portion of the operating wedge 28 and the nut 32, no additional means is required for holding the clamp-plates together. These two parts therefore not only serve as a means for operating the clamp-plates, but they also serve as a means for holding the clamp-plates in proper operating position. By forming the nut 32 with the cavity 37, it is possible for the wedge 28 to be pulled upward a considerable distance without its operation being interfered with.

My invention, although quite useful in the brake-lining industry, may be used in other industries, for example, in the barrel industry for attaching reinforcing bands. Therefore I do not wish to be limited to the particular use in which my invention is illustrated in this application.

I claim as my invention:

1. In a brake-lining clamp, the combination of: a pair of clamp-plates; a wedge for operating said clamp-plates; and wedge-working means for moving said wedge relative to said clamp-plates.

2. In a brake-lining clamp, the combination of: a pair of clamp-plates; a wedge for operating said clamp-plates; and wedge-working means for moving said wedge relative to said clamp-plates, said clamp-plates being held between said wedge and said wedge-working means.

3. In a brake-lining clamp, the combination of: a pair of clamp-plates having slots formed therein in overlapping relation; a wedge adapted to extend through said slots and to engage the walls forming one end of each slot; and wedge-working means for moving said wedge relative to said clamp-plates.

4. In a brake-lining clamp, the combination of: a pair of clamp-plates having slots formed therein in overlapping relation; a wedge adapted to extend through said slots and to engage the walls forming one end of each slot; a threaded stem extending from said wedge; and a nut advanced on said stem, said nut pressing against one of said clamp-plates, and moving said wedge relative to said clamp-plates when said nut is rotated.

5. In a brake-lining clamp, the combination of: a pair of clamp-plates having slots formed therein in overlapping relation; a wedge adapted to extend through said slots and to engage the walls forming one end of each slot; a threaded stem extending from said wedge; and a nut advanced on said stem, said nut pressing against one of said clamp-plates, and moving said wedge relative to said clamp-plates when said nut is rotated, and said nut having a cavity into which said wedge may move.

6. In a brake-lining clamp, the combination of: a pair of clamp-plates, said clamp-plates being arcuated and having the adjacent ends overlapping each other, and said clamp-plates having slots formed therein in overlapping relation; a wedge adapted to extend through said slots and to engage the walls forming one end of each slot; and wedge-working means for moving said wedge relative to said clamp-plates.

7. In a brake-lining clamp, the combination of: a pair of clamp-plates, said clamp-plates being arcuated and having the adjacent ends overlapping each other, and said clamp-plates having slots formed therein in overlapping relation; a wedge adapted to extend through said slots and to engage the walls forming one end of each slot; a threaded stem extending from said wedge; and a nut advanced on said stem, said nut pressing against one of said clamp-plates, and moving said wedge relative to said clamp-plates when said nut is rotated.

8. In a brake-lining clamp, the combination of: a pair of clamp-plates, said clamp-plates being arcuated and having the adjacent ends overlapping each other, and said clamp-plates having slots formed therein in overlapping relation; a wedge adapted to extend through said slots and to engage the walls forming one end of each slot; a threaded stem extended from said wedge; and a nut advanced on said stem, said nut pressing against one of said clamp-plates, and moving said wedge relative to said clamp-plates when said nut is rotated, and said nut having a cavity into which said wedge may move.

In testimony whereof, I have hereunto set my hand at Los Angeles, California, this 6th day of June, 1928.

GEORGE SHEAFFER.